US005983480A

United States Patent [19]

Fontaine et al.

[11] Patent Number: 5,983,480

[45] Date of Patent: Nov. 16, 1999

[54] CIRCULAR SAW BLADE CHANGING TOOL AND METHOD

[75] Inventors: Norston Fontaine; Karen Fontaine, both of Minneapolis, Minn.

[73] Assignee: Bench Dog, Inc., Minneapolis, Minn.

[21] Appl. No.: 08/833,670

[22] Filed: Apr. 8, 1997

[51] Int. Cl.$^{6}$ .............................. B23Q 3/00; B25B 1/08; B25B 1/10; B25B 1/20

[52] U.S. Cl. .......................... 29/426.5; 29/281.1; 29/283; 29/240; 269/236; 269/246; 269/909; 269/287; 81/488

[58] Field of Search .................................... 269/236, 246, 269/249, 95, 231, 319, 315, 316, 317, 318, 909; 83/399, 701, 174; 248/469, 473; 29/243.58, 240, 283, 426.5, 281.1; 81/488, 3.08

[56] References Cited

U.S. PATENT DOCUMENTS

| | | | |
|---|---|---|---|
| 2,918,165 | 12/1959 | Paulick | 206/16 |
| 3,129,731 | 4/1964 | Tyrrell | 143/32 |
| 3,805,639 | 4/1974 | Peter | 83/860 |
| 4,212,455 | 7/1980 | Eckley | 269/236 |
| 4,297,921 | 11/1981 | Wydra | 81/3 |
| 4,624,644 | 11/1986 | Hall . | |
| 4,657,428 | 4/1987 | Wiley | 403/359 |
| 4,706,386 | 11/1987 | Wiley | 30/388 |
| 4,787,147 | 11/1988 | Wiley | 30/388 |
| 4,882,960 | 11/1989 | Kugler | 29/240 |
| 4,934,037 | 6/1990 | Schuerg et al. . | |
| 5,317,944 | 6/1994 | Hewitt | 83/447 |

OTHER PUBLICATIONS

Dorsch, C., "Shop Solutions", *Woodwork*, Oct. 1996, 5 pages.

*Primary Examiner*—David P. Bryant
*Assistant Examiner*—John Preta
*Attorney, Agent, or Firm*—Crompton, Seager & Tufte, LLC

[57] ABSTRACT

A blade changing tool for changing a table saw blade having a cutting blade. The table saw has a top surface and at least a portion of the blade is disposed above the top surface. The blade changing tool includes a housing having a top and two oppositely disposed sides defining a blade slot therebetween. The blade slot is dimensioned such that the slot can conceal at least a substantial portion of the blade edge disposed above the top surface of the table. A projection extends transversely from at least one of the sides to retain the housing from rotation relative to the table. The tool can include apparatus for retaining the blade against rotation relative to the housing.

4 Claims, 4 Drawing Sheets

CIRCULAR SAW BLADE CHANGING TOOL AND METHOD

FIELD OF THE INVENTION

The present invention pertains to tools used to assist in the removal and installation of circular saw blades.

BACKGROUND OF THE INVENTION

A circular table saw blade installation or removal generally requires loosening or tightening an arbor nut connected to a drive shaft on which the blade is mounted. When the arbor nut is rotated to install or remove the blade, the shaft also rotates. Thus, the arbor nut cannot be removed from or installed on the drive shaft unless the shaft and/or blade are held against rotation.

The table saw operator generally uses two tools to change a blade: one tool to hold the blade still on the shaft and one tool to unscrew the arbor nut. Operators commonly use a piece of scrap wood to hold the blade in place. This method requires unplugging the saw, removing the table insert, removing the blade guard, raising the arbor to maximum height, positioning the piece of wood into the insert opening and then engaging the blade's teeth with the wood to prevent blade rotation. Once the blade is held in place with the wood, the operator then uses a wrench to adjust the arbor nut. While exerting torque on the wrench, the operator's hands are generally within 3–10 cm away from the blades exposed teeth. The "wood method" does not work well nor is it safe. To tighten the arbor nut on a blade, the operator must move the wrench toward the back of the machine and toward the leading edge of the blade's teeth. To prevent rotation of the blade, the piece of wood must engage the blade's teeth toward the rear of the table. The saw's teeth, however, face the operator, opposite the direction of the tightening motion and away from the wood. While the operator moves the wrench toward the leading edge of the blade's teeth, the wrench or hand could slip, potentially resulting in lacerations to the operator's hands. The wood, as well, often slips, allowing the blade to move freely, allowing the operator to fall onto the blade Additionally, permanent blade deflection can potentially result in blade damage. To obtain positive engagement between the wood and the blade teeth, i.e., to get the blade to bite into the wood, the operator must forcefully work the wood into the gullets between the teeth. Deflection can be caused as a piece of wood is jammed between the blade edge and the table insert opening or top surface of the table saw.

U.S. Pat. No. 4,297,921 to Wydra modifies the wood method. However, the operator's hands are still exposed to the blade's teeth. Further, the blade's teeth are not protected from chipping, nor are the blade's sides protected from marring which can be caused by the wrench slipping from the arbor nut and hitting the blade.

A few table saw models allow an operator to use one hand to immobilize the blade with a wrench while the other hand unscrews the arbor nut with a second wrench. As with the wood method, or that disclosed by Wydra, both hands are less than 10 cm from the exposed teeth, and the blade's teeth are not protected. In fact, the problem of protecting the blade's teeth and sides is exacerbated by the use of two wrenches.

U.S. Pat. No. 4,212,455 to Eckley discloses a blade changing device including a screw, a pin, or cantilever that pinches the blade in a grooved holder. The Eckley device stops the blade from rotating while tightening or loosening the arbor nut, however, the device covers a very small portion of the blade's exposed teeth or cutting edge. Thus, as explained with respect to the previous devices and methods, the operator's hands are exposed to the cutting teeth and the cutting teeth and blade sides are exposed to the wrench used for adjusting the arbor nut.

Eckley's device requires the operator to remove the factory blade guard to tighten the arbor nut. Once the factory guard is removed, the operator may not replace it. This is true especially among operators who have used a power saw for a period of time, they can become over-confident that nothing could go wrong on a machine and believe that it is not worthwhile to replace the factory guard. This may result in an accident that could cause serious injury to the operator.

It has been proposed that to protect saw blades from chipping during installation or removal, the blade's cutting edge or teeth be wrapped in plastic tubing having a longitudinal slit for receiving the blade's teeth. Placing the tubing on, and removing the tubing from the blade exposes the operator to the blade's teeth. The tubing provides no protection for the side of the blade, nor does the tubing lock the blade in place while adjusting the arbor nut.

Special purpose saw blades have been developed for cutting different materials and achieving different results with the same material, as a result, the frequency of blade changing has increased. To obtain the best results, the appropriate cutting blade must be used. Furthermore, dull or inappropriate blades require excessive force to push the stock to be cut. Increasing the force against the stock increases the risk to operators as their hands are more forcefully pushed toward the blade. Thus, a device is needed that will provide for quick attachment and removal of circular saw blades, and provide protection for the operator during blade changing and protect the blade.

SUMMARY OF THE INVENTION

The present invention pertains to a blade changing tool and method. The blade changing tool of the present invention protects the operator's hands from the blade cutting edge or teeth while changing the blade. Conversely, the teeth are protected from the wrench used by the operator when changing the blade. The blade changing tool of the present invention can be configured to protect the sides of the blade as well as the blade's teeth. The tool can also be configured to be used without removing the factory blade guard.

In accordance with the present invention, a blade changing tool is provided for changing table saw blades. The table saw includes a top surface having an insert opening through which at least a portion of the blade is disposed above the top surface. The blade includes teeth or a cutting edge.

The blade changing tool includes a housing having a top and two oppositely disposed sides defining a blade slot therebetween. The blade slot is dimensioned such that the slot can conceal at least approximately one-third of the blade edge disposed above the top surface of the table. A first projection extends transversely from at least one of the sides to retain the housing against rotation relative to the table.

The blade changing tool preferably includes means for retaining the blade against rotation relative to the housing. These means could include teeth within the slot, friction fit of the blade within the slot, as well as other suitable means for retaining the blade.

The slot can also be dimensioned such that it can conceal at least half of the portion of the cutting edge of the blade disposed above the top surface of the table saw. The tool can also include a second projection extending transversely from at least one of the sides to retain the housing from rotation relative to the table. The first projection can be disposed proximate the front of the housing and the second projection can be disposed proximate the back of the housing.

A method for removing the table saw blade from the table saw is also disclosed. To perform the method, a housing is provided having a top and oppositely disposed sides defining a blade slot therebetween. The blade slot is dimensioned such that the slot can conceal at least approximately one-third of the blade edge disposed above the top surface of the table. The housing is fixed against rotation relative to the blade. The housing is also fixed against rotation relative to the table. Then the arbor nut and blade are removed.

A similar method is provided for installing a table saw blade. In this case, the blade is held against rotation during installation of the blade and the arbor nut.

DETAILED DESCRIPTION OF THE INVENTION

Figure 1:
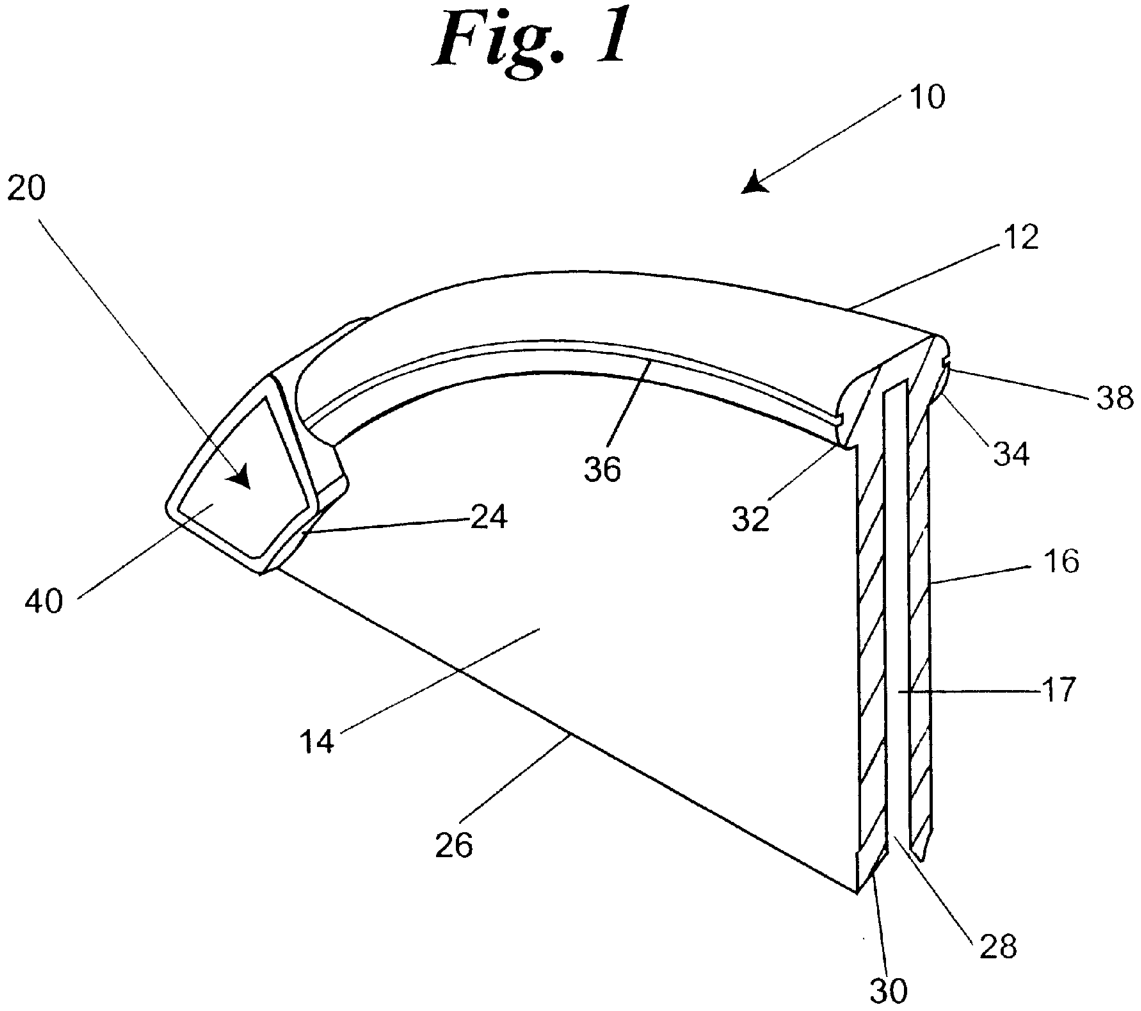
FIG. 1 is a partial perspective and cross sectional view of the blade changing tool of FIG. 2.
Figure 2:
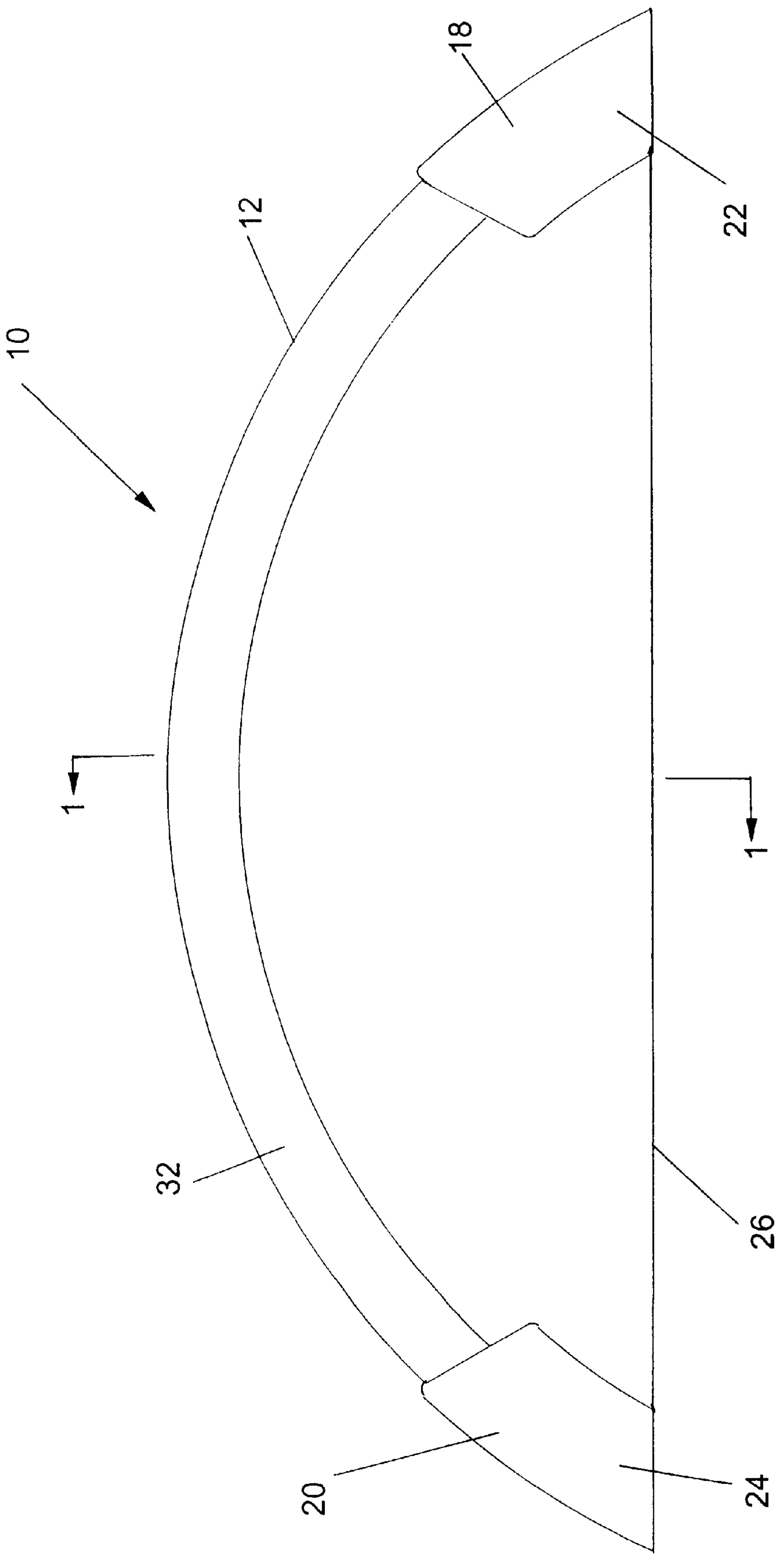
FIG. 2 is a side view of a blade changing tool in accordance with the present invention.

Referring now to the drawings wherein like reference numerals refer to like elements throughout the several views, a blade changing tool 10 is shown in a partial perspective and cross sectional view in FIG. 1 and a side view in FIG. 2. Tool 10 includes a top or spine 12 and two oppositely disposed sides 14 and 16. A blade receiving slot 17 is defined by top 12 and sides 14 and 16. Blade changing tool 10 preferably includes a front foot 18 and a rear foot 20, each having a transverse projection or foot thrust 22 and 24 respectively. Sides 14 and 16 each include resting edges 26 and 28, respectively, opposite top 12. Slot 18 can include a taper 30 proximate edges 26 and 28.

Top 10 can include transversely extending ribs 32 and 34. Ribs 32 and 34 can define longitudinally extending grooves 36 and 38, respectively. Ribs 32 and 34 can be used by an operator to grasp blade changing tool 10. Grooves 36 and 38 (not shown in FIG. 2) can be formed to provide friction between ribs 32 and 34 and an operator's hand. Foot thrusts 22 and 24 can similarly include a recess portion 40 to aid an operator in grasping tool 10 (recesses not shown in FIG. 2).

In a preferred embodiment, blade changing tool 10 is formed from rigid, injection molded plastic. It can be appreciated by those skilled in the art, however, that the tool could be constructed from other material such as wood, metal, fiberglass or other materials sufficiently resistant to abrasion from saw blade teeth. The depth of slot 18 is preferably approximately equal to the height of a saw blade extending above a top surface of a table saw. The width of slot 18 is preferably, approximately equal to the width of the saw blade to be installed and removed. In one embodiment, the depth of slot 18 can be slightly less than the height of the saw blade extending from the top surface of the table saw such that the blade's teeth will engage the top of slot 18. If tool 10 is formed from a relatively deformable plastic or other material, the saw teeth can be temporarily embedded in the top of slot 18 to retain the blade from rotation relative to tool 10. In a preferred embodiment of tool 10, the width of slot 18 can be sufficiently narrow to provide a friction fit between the blade and the sides 14 and 16 to restrain rotation of the blade relative to tool 10. Similarly, sides 14 and 16 could be biased toward each other by a C-clamp or the like, to press against the blade creating a friction fit.

Figure 3:
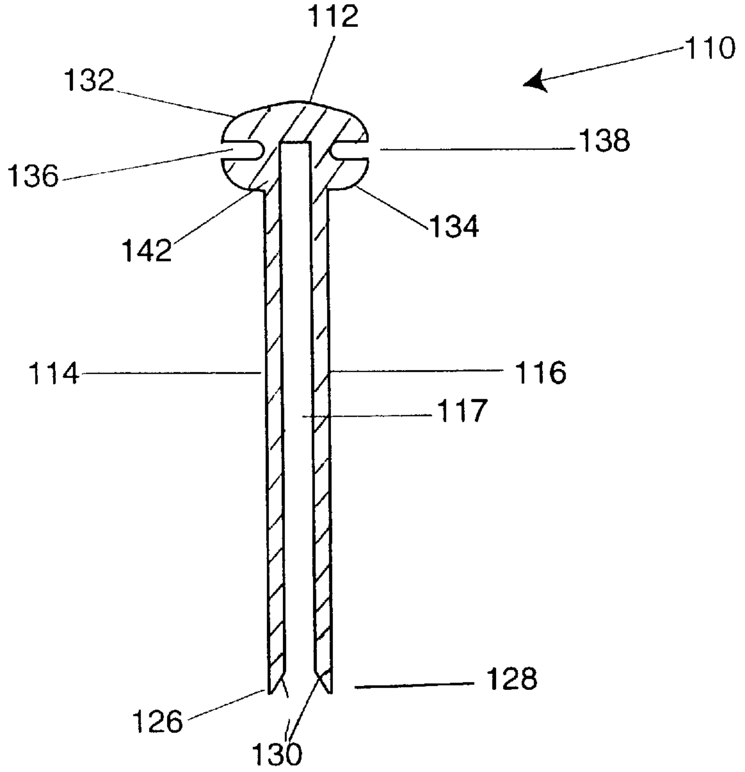
FIG. 3 is an alternate cross sectional view of the blade changing tool of FIG. 2.

An alternate embodiment 110 of a blade changing tool in accordance with the present invention is shown in cross section in FIG. 3. Blade changing tool 110 preferably includes the same or similar features as blade changing tool 10. These features or elements are referred to by the same reference numerals used in describing blade changing tool 10 with the addition of a preceding "1". As can be seen in FIG. 3, which is a transverse cross section of blade changing tool 110, slot 17 includes a generally U-shaped tooth 142 extending downwardly from top 112. Tool 110 can include a plurality of teeth 142 disposed along the top of groove 117 at spaced intervals to engage with the teeth of a saw blade inserted within slots 117. Teeth 142 preferably extend radially from the top of slot 118, generally toward the center of a saw blade disposed therein.

Figure 4:
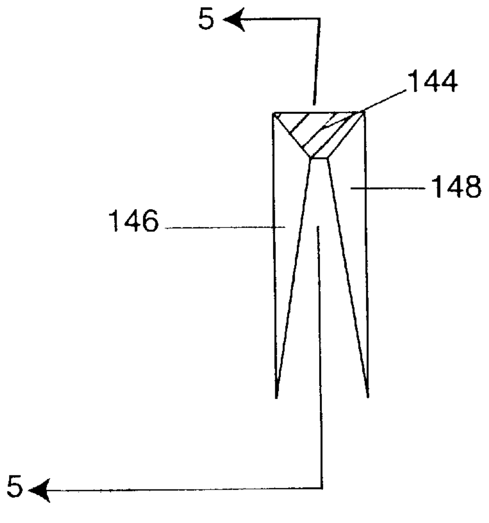
FIG. 4 is a side view of a blade retaining tooth.

FIG. 4 is an enlarged view of the tooth 142 including a top portion 144 and two tapered side portions 146 and 148. Tapered portions 144, 146 and 148 are preferably sized to engage the gullets between saw blade teeth.

Figure 5:
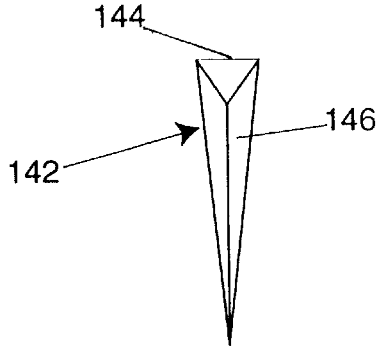
FIG. 5 is a cross sectional view of the blade retaining tooth of FIG. 4.

FIG. 5 is a cross sectional view of tooth 142 taken from FIG. 4. As can be seen by examining FIGS. 4 and 5, tapered portions 144, 146 and 148 preferably have a triangular cross sectional shape where the base of the cross section is adjacent the walls of slot 117 and the angle opposite the base of the triangular cross section points inward toward slot 117.

Figure 6:
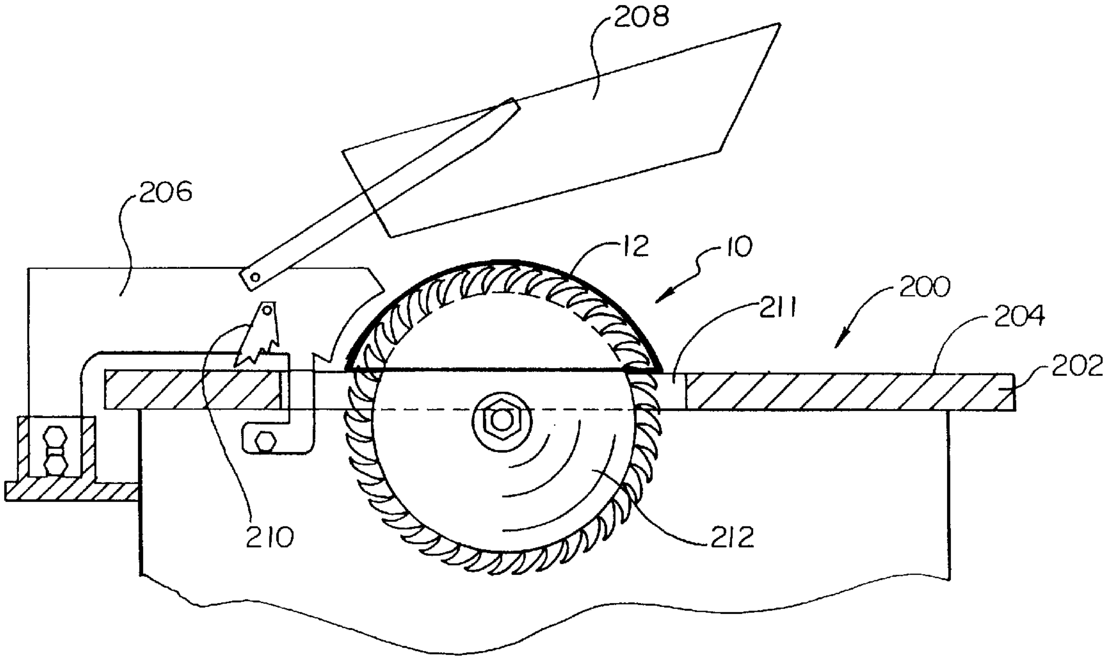
FIG. 6 is a side view of the blade changing tool mounted on a table saw and blade.
Figure 7:
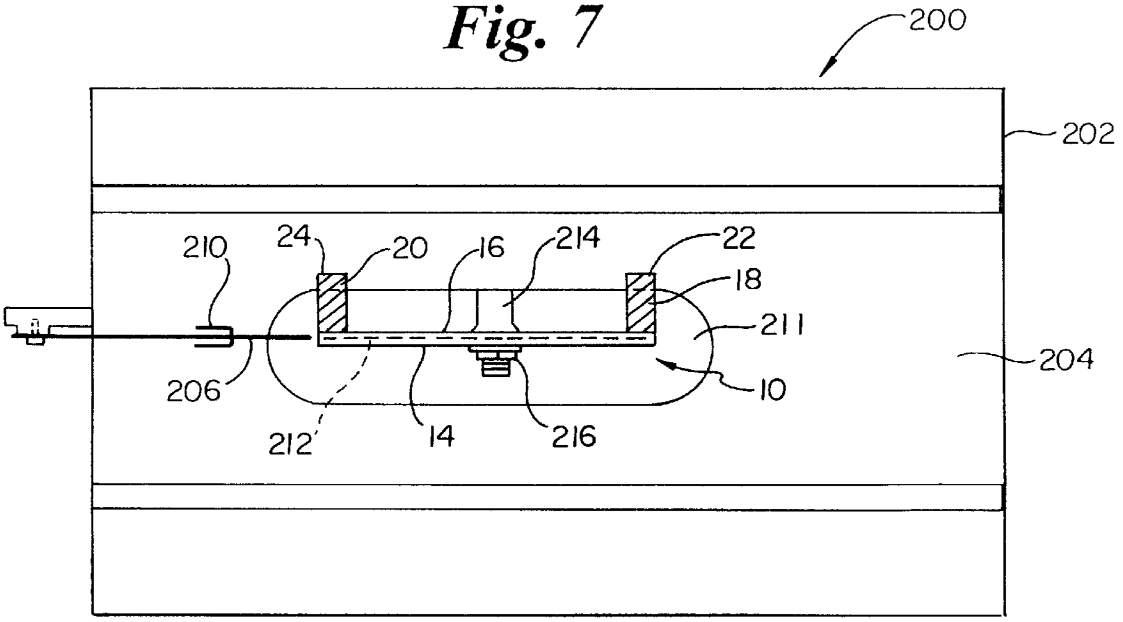
FIG. 7 is a top view of the blade changing tool and table saw of FIG. 6.

FIG. 6 is a side view of a typical table saw 200 having a table portion 202 having a top surface 204. FIG. 7 is a top view of saw 200. Disposed at the rear of table saw 200 is a splitter 206 to which are rotatably attached a blade guard 208 (blade guard 208 is not shown in FIG. 7 for clarity) and anti-kickback pawls 210. The table insert has been removed for blade changing from opening 211. Blade 212 is attached to a drive shaft 214 by an arbor nut 216.

In use, blade changing tool 10 is disposed over the portion of blade 212 extending above top surface 204 of saw 200. Blade 212 is disposed within blade 17. Top 12 of tool 10 conforms sufficiently to the shape of the blade such that tool 10 will fit between splitter 206 and blade guard 208 without having to remove them from saw 200. Foot thrusts 22 and 24 extend transversely sufficiently to extend beyond opening 211 to engage top surface 204. As described above, teeth 142, a clamp, friction fit or the like can retain tool 10 against rotation relative to blade 212. Foot thrusts 22 and 24, thus retain blade 212 and tool 10 from rotation relative to table 200. At this point, arbor nut 216 can be adjusted to install or remove blade 212 as generally known to those skilled in the art.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. A method for removing a table saw blade from a table saw having a top surface, and at least a portion of the blade being disposed above the top surface, the blade having a cutting edge, having teeth, and being connected to the table saw by a nut, the method comprising the steps of:

providing a housing having a top and two oppositely disposed sides defining a blade slot therebetween, the blade slot being dimensioned such that the slot can conceal at least approximately one-half of the blade edge disposed above the top surface;

the housing further including housing teeth adapted to engage the teeth of the blade;

engaging the teeth of the blade with the housing teeth to rotationally fix the housing relative to the blade;

fixing the housing against rotation relative to the table; and removing the nut and the blade from the saw.

2. A method for removing a table saw blade from a table saw having a top surface, and at least a portion of the blade being disposed above the top surface, the blade having a cutting edge, having teeth, and being connected to the table saw by a nut, the method comprising the steps of:

providing a housing having a top and two oppositely disposed sides defining a blade slot therebetween, the blade slot being dimensioned such that the slot can conceal at least approximately one-half of the blade edge disposed above the top surface;

engaging the saw blade teeth with the housing;

wherein the housing is fixed against rotation relative to the blade;

fixing the housing against rotation relative to the table; and removing the nut and the blade from the saw.

3. A method for installing a table saw blade from a table saw having a top surface, and at least a portion of the blade being disposed above the top surface, the blade having a cutting edge, having teeth, and being connected to the table saw by a nut, the method comprising the steps of:

providing a housing having a top and two oppositely disposed sides defining a blade slot therebetween, the blade slot being dimensioned such that the slot can conceal at least approximately one-half of the blade edge disposed above the top surface;

the housing further including housing teeth adapted to engage the teeth of the blade;

engaging the teeth of the blade with the housing teeth to rotationally fix the housing relative to the blade;

fixing the housing against rotation relative to the table; and installing the nut and the blade on the saw.

4. A method for installing a table saw blade from a table saw having a top surface, and at least a portion of the blade being disposed above the top surface, the blade having a cutting edge, having teeth, and being connected to the table saw by a nut, the method comprising the steps of:

providing a housing having a top and two oppositely disposed sides defining a blade slot therebetween, the blade slot being dimensioned such that the slot can conceal at least approximately one-half of the blade edge disposed above the top surface;

engaging the saw blade teeth with the housing;

wherein the housing is fixed against rotation relative to the blade;

fixing the housing against rotation relative to the table; and installing the nut and the blade on the saw.

* * * * *